United States Patent
Pan et al.

(10) Patent No.: US 10,605,260 B2
(45) Date of Patent: Mar. 31, 2020

(54) FULL-SPAN FORWARD SWEPT AIRFOILS FOR GAS TURBINE ENGINES

(71) Applicant: United Technologies Corporation, Farmington, CT (US)

(72) Inventors: Li Xing Pan, Middletown, CT (US); Yuan Dong, Glastonbury, CT (US); Simon W. Evans, Farmington, CT (US); Robert W. Fessenden, Manchester, CT (US); Sue-Li Kingsley Chuang, Glastonbury, CT (US); Sean Nolan, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 601 days.

(21) Appl. No.: 15/261,011

(22) Filed: Sep. 9, 2016

(65) Prior Publication Data

US 2018/0073517 A1 Mar. 15, 2018

(51) Int. Cl.
*F04D 29/32* (2006.01)
*F02K 3/06* (2006.01)
(Continued)

(52) U.S. Cl.
CPC ........... *F04D 29/324* (2013.01); *F01D 5/141* (2013.01); *F02K 3/06* (2013.01); *F04D 19/02* (2013.01); *F04D 29/386* (2013.01); *F04D 29/542* (2013.01); *F05D 2220/32* (2013.01); *F05D 2220/3216* (2013.01); *F05D 2240/12* (2013.01); *F05D 2240/30* (2013.01);
(Continued)

(58) Field of Classification Search
CPC .... F04D 29/324; F04D 29/386; F04D 29/542; F04D 19/02; F04D 29/32; F01D 5/141; F02K 3/06; F05D 2220/32; F05D 2220/3216; F05D 2240/12; F05D 2240/30; F05D 2240/301; F05D 2240/303; F05D 2240/304; F05D 2250/38
See application file for complete search history.

(56) References Cited

U.S. PATENT DOCUMENTS 2,807,436 A * 9/1957 Hockert ................ F01D 5/3007
416/220 R
4,995,787 A * 2/1991 O'Connor ............. F04D 29/326
415/119
(Continued)

FOREIGN PATENT DOCUMENTS

| EP | 0425889 A1 | 5/1991 |
| EP | 1985802 A2 | 10/2008 |
| JP | H1089289 A | 4/1998 |

OTHER PUBLICATIONS

European Search Report for Application No. EP 17 18 0363.
(Continued)

*Primary Examiner* — Justin D Seabe
*Assistant Examiner* — Joshua R Beebe
(74) *Attorney, Agent, or Firm* — Cantor Colburn LLP

(57) ABSTRACT

Rotor of a gas turbine engines having a rotor hub and a plurality of blades extending from the rotor hub, wherein each blade has a full-span forward sweep along a leading edge of the blade that starts at an airfoil root of the blade at the hub and extends to a blade tip, wherein a sweep of a blade is a percentage of a root axial chord length of the respective blade.

12 Claims, 10 Drawing Sheets

(51) Int. Cl.
  *F04D 19/02* (2006.01)
  *F04D 29/54* (2006.01)
  *F01D 5/14* (2006.01)
  *F04D 29/38* (2006.01)

(52) U.S. Cl.
  CPC .. *F05D 2240/301* (2013.01); *F05D 2240/303* (2013.01); *F05D 2240/304* (2013.01); *F05D 2250/38* (2013.01)

(56) References Cited

U.S. PATENT DOCUMENTS

| | | | | |
|---|---|---|---|---|
| 5,067,876 A | * | 11/1991 | Moreman, III | F01D 5/3007 416/219 R |
| 5,167,489 A | * | 12/1992 | Wadia | B64C 11/18 415/182.1 |
| 5,725,354 A | * | 3/1998 | Wadia | F01D 5/147 416/224 |
| 6,071,077 A | * | 6/2000 | Rowlands | F01D 5/141 416/223 A |
| 6,195,983 B1 | * | 3/2001 | Wadia | F01D 5/141 415/208.1 |
| 8,047,802 B2 | | 11/2011 | Clemen | |
| 2008/0199320 A1 | * | 8/2008 | Matheny | F01D 5/147 416/220 R |

OTHER PUBLICATIONS

Vo, et al. "Desensitization of Axial Compressor Performance and Stability to Tip Clearance Size", Proceedings of ASME Turbo Expo 2015: Turbine Technical Conference and Exposition GT2015, Jun. 15-19 held in Montreal, Canada; 14 pages.

\* cited by examiner

Axial Direction

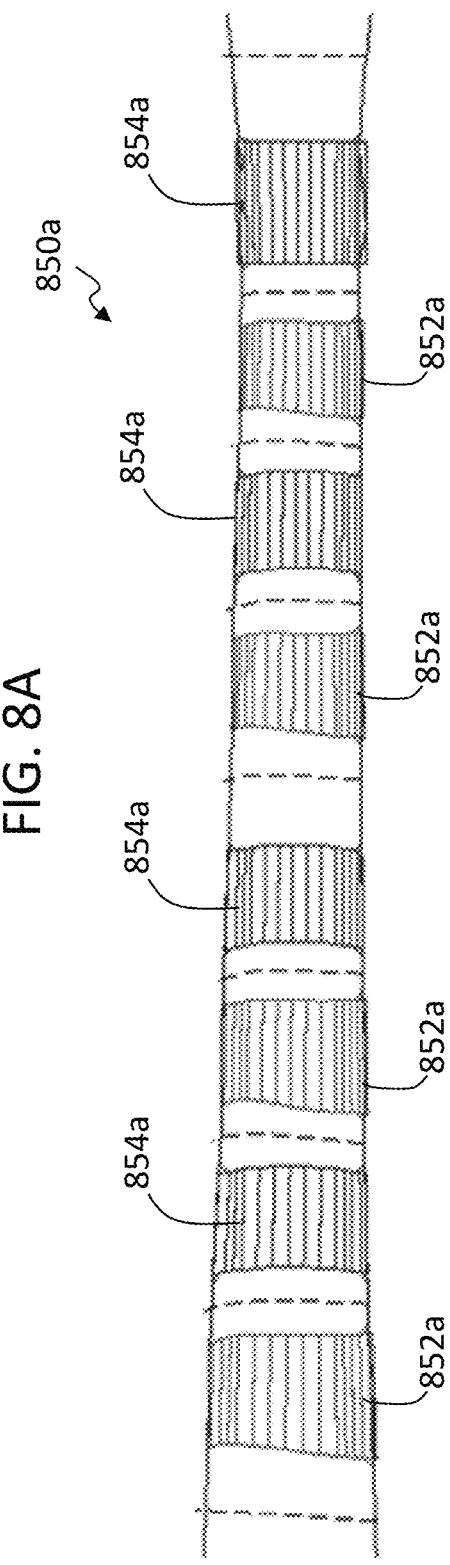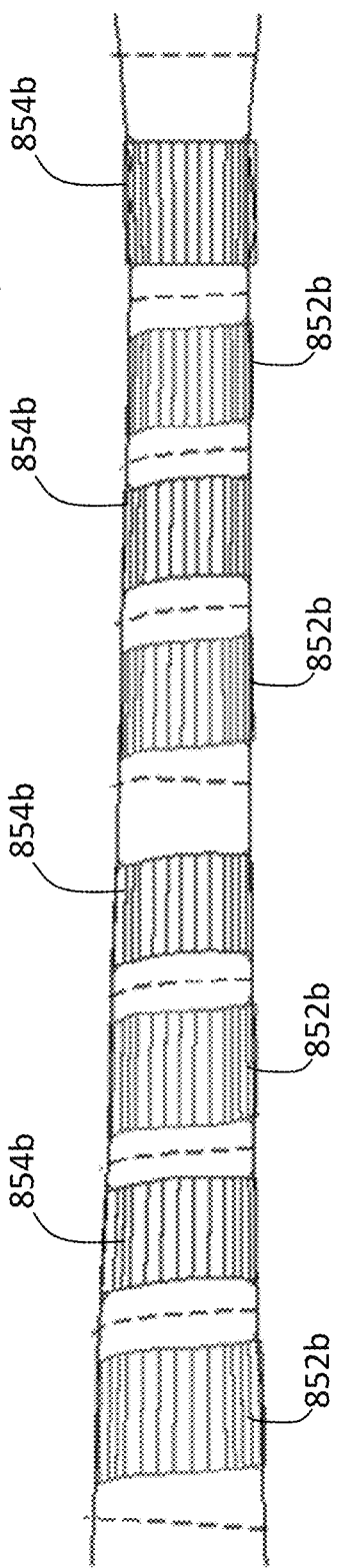

FULL-SPAN FORWARD SWEPT AIRFOILS FOR GAS TURBINE ENGINES

STATEMENT REGARDING FEDERALLY SPONSORED RESEARCH OR DEVELOPMENT

This invention was made with government support under Contract No. NNC14CA36C awarded by the U.S. National Aeronautics and Space Administration. The government has certain rights in the invention.

BACKGROUND

The subject matter disclosed herein generally relates to gas turbine engines and, more particularly, to full-span forward sweep airfoils for gas turbine engines.

Modern axial compressors are often tip-limited in terms of stability. This is especially true for small-core machines because the ability to control clearances does not improve as the diameter decreases. Accordingly, the clearance-to-span and clearance-to-chord ratios are typically larger for small-core compressors. Any design feature that can help mitigate the sensitivity of the compressor to large clearance-to-span and clearance-to-chord ratios, and the associated tip clearance, can improve the stability and/or efficiency of the compressor and thus the gas turbine engine.

SUMMARY

According to one embodiment, rotors of gas turbine engines are provided. The rotors include a rotor hub and a plurality of blades extending from the rotor hub, wherein each blade has a full-span forward sweep along a leading edge of the blade that starts at an airfoil root of the blade at the hub and extends to a blade tip, wherein a sweep of a blade is a percentage of a root axial chord length of the respective blade.

In addition to one or more of the features described above, or as an alternative, further embodiments of the rotor may include that the full-span forward sweep has a sweep of between 0% and 25% of the root axial chord length of the blade.

In addition to one or more of the features described above, or as an alternative, further embodiments of the rotor may include that the full-span forward sweep is a sweep of between 5% and 25% of the root axial chord length of the blade.

In addition to one or more of the features described above, or as an alternative, further embodiments of the rotor may include that the full-span forward sweep is a sweep of between 7% and 14% of the root axial chord length of the blade.

In addition to one or more of the features described above, or as an alternative, further embodiments of the rotor may include that each blade has a full-span forward sweep along a trailing edge of the blade that starts at the airfoil root of the blade at the hub and extends to the blade tip.

In addition to one or more of the features described above, or as an alternative, further embodiments of the rotor may include that the trailing edge of each blade has the same sweep as the leading edge.

In addition to one or more of the features described above, or as an alternative, further embodiments of the rotor may include that the trailing edge of each blade has a sweep that is less than the sweep of the leading edge.

In addition to one or more of the features described above, or as an alternative, further embodiments of the rotor may include that the leading edge has a sweep of 14% of the root axial chord length or greater and the trailing edge has a sweep of less than 25% of the root axial chord length.

In addition to one or more of the features described above, or as an alternative, further embodiments of the rotor may include that the leading edge has a sweep of 14% of the root axial chord length and the trailing edge has a sweep of 18% of the root axial chord length.

According to another embodiment, gas turbine engines are provided. The gas turbine engines include a plurality of stator portions each having a plurality of vanes and a plurality of rotor portions, wherein the stator portions and the rotor portions alternate to form a compressor section of the gas turbine engine. Each rotor portion includes a rotor hub and a plurality of blades extending from the rotor hub, wherein each blade has a full-span forward sweep along a leading edge of the blade that starts at an airfoil root of the blade at the hub and extends to a blade tip, wherein a sweep of a blade is a percentage of a root axial chord length of the respective blade.

In addition to one or more of the features described above, or as an alternative, further embodiments of the engine may include that the full-span forward sweep has a sweep of between 0% and 25% of the root axial chord length of the blade.

In addition to one or more of the features described above, or as an alternative, further embodiments of the engine may include that the full-span forward sweep is a sweep of between 5% and 25% of the a root axial chord length of the blade.

In addition to one or more of the features described above, or as an alternative, further embodiments of the engine may include that the full-span forward sweep is a sweep of between 7% and 14% of the root axial chord length of the blade.

In addition to one or more of the features described above, or as an alternative, further embodiments of the engine may include that each blade has a full-span forward sweep along a trailing edge of the blade that starts at the airfoil root of the blade at the hub and extends to the blade tip.

In addition to one or more of the features described above, or as an alternative, further embodiments of the engine may include that the trailing edge of each blade has the same sweep as the leading edge.

In addition to one or more of the features described above, or as an alternative, further embodiments of the engine may include that the trailing edge of each blade has a sweep that is less than the sweep of the leading edge.

In addition to one or more of the features described above, or as an alternative, further embodiments of the engine may include that the leading edge has a sweep of 14% of the root axial chord length or greater and the trailing edge has a sweep of less than 25% of the root axial chord length.

In addition to one or more of the features described above, or as an alternative, further embodiments of the engine may include that the leading edge has a sweep of 14% of the root axial chord length and the trailing edge has a sweep of 18% of the root axial chord length.

In addition to one or more of the features described above, or as an alternative, further embodiments of the engine may include that the full-span forward sweeps of the blades of each rotor section is the same.

In addition to one or more of the features described above, or as an alternative, further embodiments of the engine may include that the vanes of the stator portions are swept to accommodate the sweep of the blades of the rotor portions.

Technical effects of embodiments of the present disclosure include a rotor having airfoils with full-span forward sweep. Further technical effects include, in some embodiments, an improved surge margin of tip-limited axial compressors (e.g., small-core axial high pressure compressors) by the full-span forward sweep. Further technical effects include a rotor having decreased number of airfoils, and thus increased efficiency and weight reduction of a rotor.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 8A is a schematic illustration of a portion of a gas turbine engine having locally swept blades;

FIG. 8B is a schematic illustration of a portion of a gas turbine engine having full-span forward swept blades in accordance with an embodiment of the present disclosure.

DETAILED DESCRIPTION

Figure 1A:
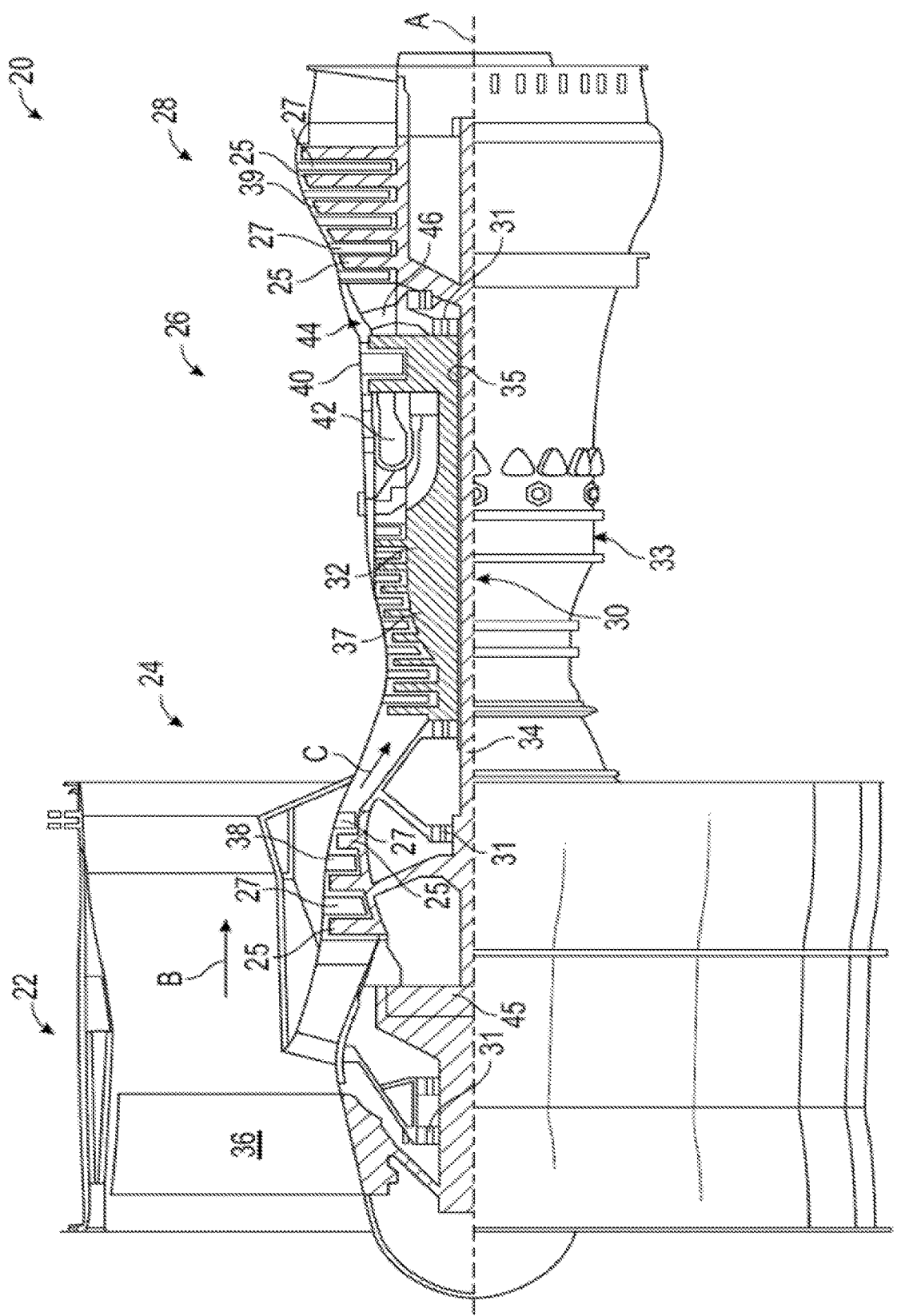
FIG. 1A is a schematic cross-sectional illustration of a gas turbine engine architecture that may employ various embodiments disclosed herein.

As shown and described herein, various features of the disclosure will be presented. Various embodiments may have the same or similar features and thus the same or similar features may be labeled with the same reference numeral, but preceded by a different first number indicating the Figure Number to which the feature is shown. Thus, for example, element "##" that is shown in FIG. X may be labeled "X##" and a similar feature in FIG. Z may be labeled "Z##." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion of the combustion gases from the combustor 42.

The pressure ratio of the low pressure turbine 39 can be measured by comparing the pressure at the outlet of the low pressure turbine 39 and prior to an exhaust nozzle of the gas turbine engine 20 with the pressure prior to the inlet of the low pressure turbine 39. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. The fuel consumption of the engine at this flight condition, with the gas turbine engine 20 at its best fuel consumption, is known as bucket cruise Thrust Specific Fuel Consumption (TSFC). TSFC is an industry standard parameter of fuel consumption per unit of thrust.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies deliver or extract energy (in the form of pressure) to or from the core airflow that is communicated through the gas turbine engine 20 along the core flow path C. The vanes 27 of the vane assemblies direct the core airflow to the blades 25 to either deliver or extract energy to or from the flow, respectively.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Figure 1B:
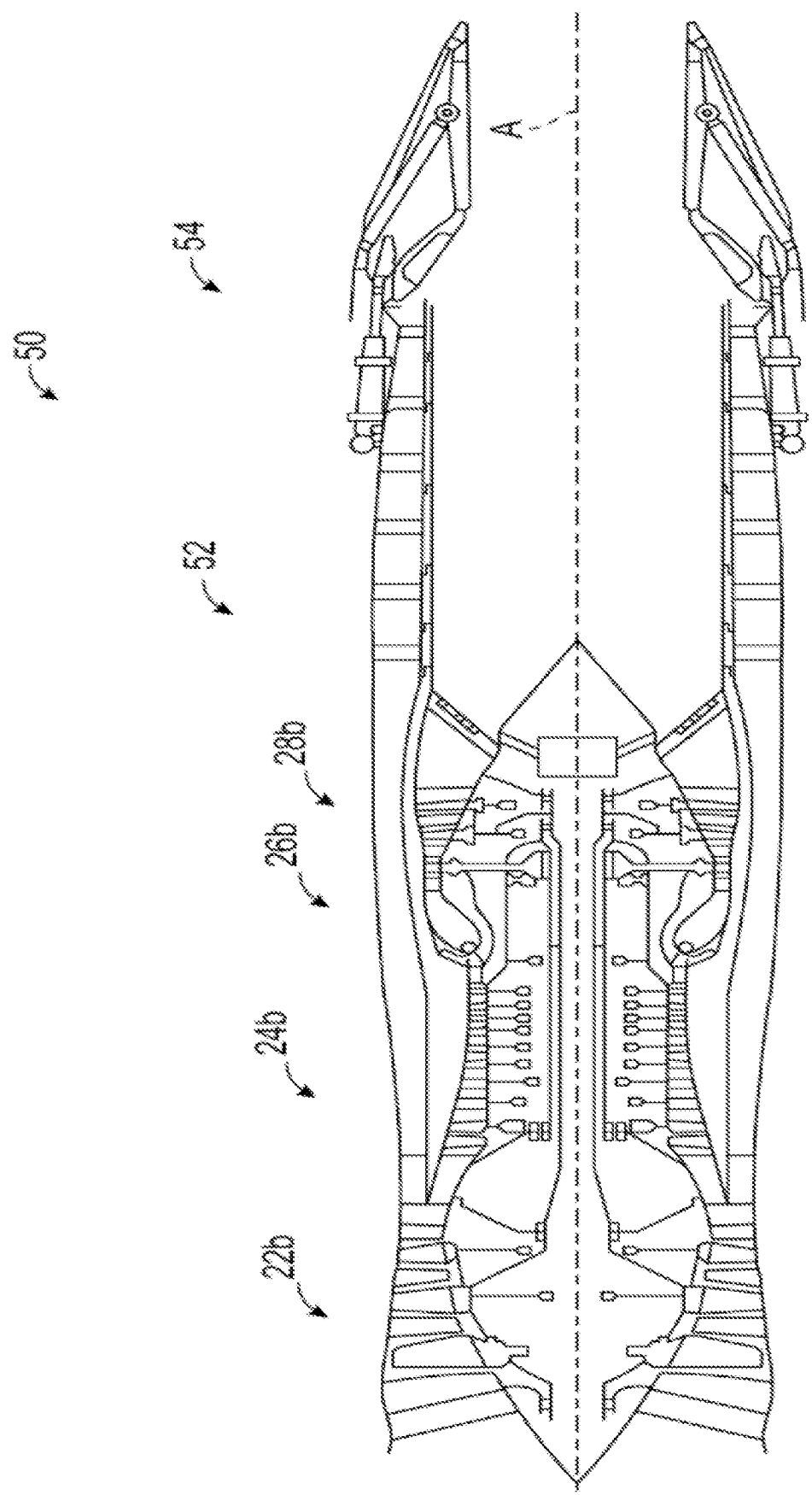
FIG. 1B is a schematic cross-sectional illustration of another gas turbine engine architecture that may employ various embodiments disclosed herein.

Referring to FIG. 1B, an alternative engine architecture of a gas turbine engine 50 may also include an augmentor section 52 and an exhaust duct section 54 among other systems or features. Otherwise, the engine architecture of the gas turbine engine 50 may be similar to that shown in FIG. 1A. That is, the gas turbine engine 50 includes a fan section 22b that drives air along a bypass flowpath while a compressor section 24b drives air along a core flowpath for compression and communication into a combustor section 26b then expansion through a turbine section 28b.

Although two architectures for gas turbine engines are depicted (e.g., high bypass turbofan in FIG. 1A, low bypass augmented turbofan FIG. 1B) in the disclosed non-limiting embodiments, it should be understood that the concepts described herein are not limited to use with the shown and described configurations, as the teachings may be applied to other types of gas turbine engines such as, but not limited to, geared/non-geared turbojets, turboshafts, geared/non-geared three-spool (plus fan) turbofans, and turboprop engines (e.g., pusher, tug, etc.) wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
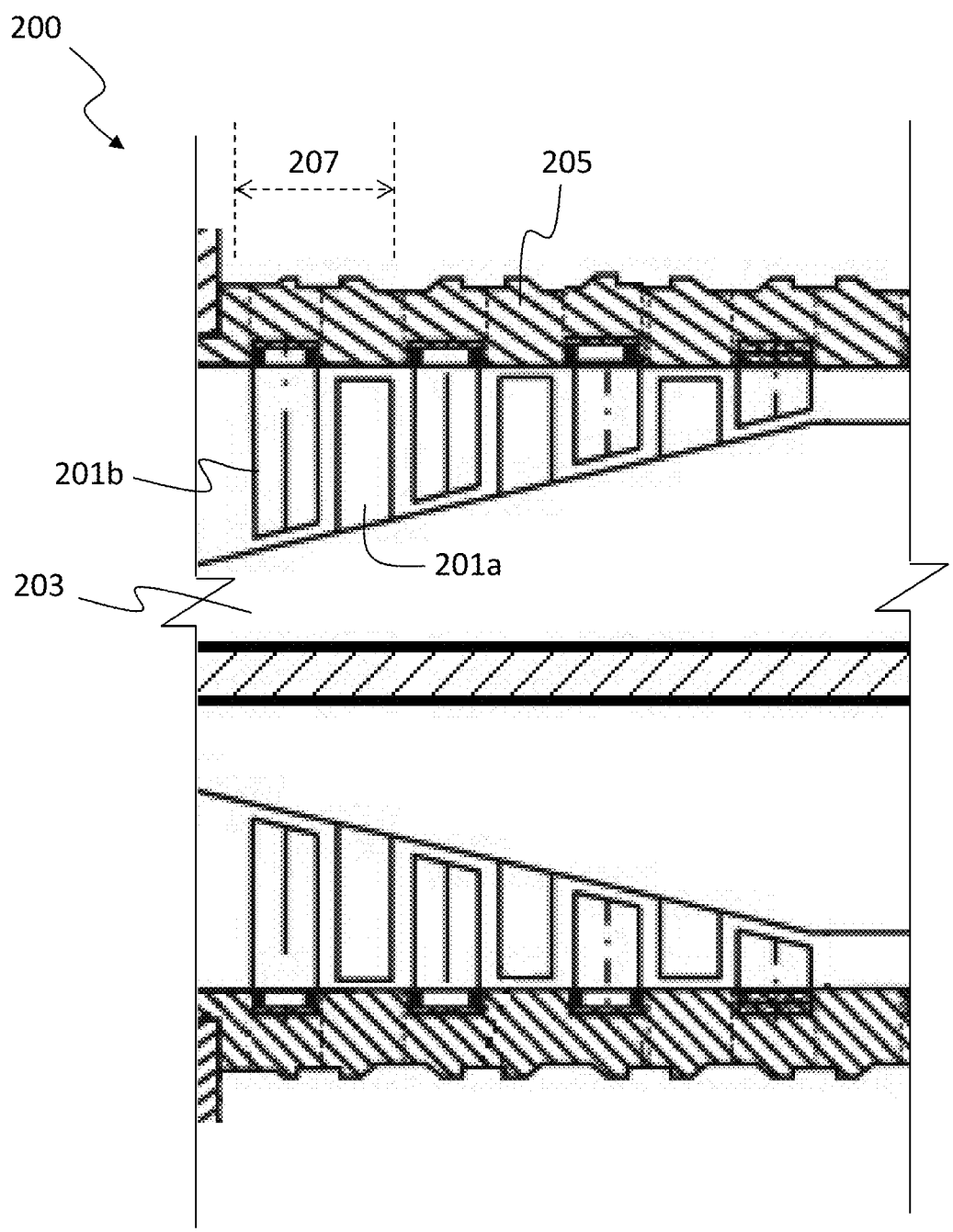
FIG. 2 is a schematic illustration of a compressor section of a gas turbine engine that may employ various embodiments disclosed herein.

FIG. 2 is a schematic view of a compressor section of a gas turbine engine that may employ various embodiments disclosed herein. Compressor section 200 includes a plurality of airfoils, including, for example, one or more blades 201a and vanes 201b (generically referred to as "airfoil 201"). The blades 201a are configured to rotate one or more rotor hubs 203 (depending on engine configuration), and, in some embodiments, may be integrally formed with the respective hub 203. The vanes 201b are fixedly attached to a case 205. An adjacent blade 201a and vane 201b can form a stage 207 of the compressor section 200. Each stage 207 has a plurality of blades 201 extending from the hub 203 (whether integrally formed or separately attached) and a plurality of vanes 202 extending from the case 205. The case 205 can have multiple parts (e.g., turbine case, diffuser case, etc.). In various locations, components, such as seals, may be positioned between airfoils 201 and the case 205.

Embodiments of the present disclosure are directed to airfoils on rotors of gas turbine engines that have improved efficiency. For example, in some embodiments, airfoils of the present disclosure are configured or formed such that the entire airfoil (from hub to tip) is tilted forward. That is, the airfoils have a full-span forward sweep (see, e.g., FIG. 9). In accordance with various embodiments of the present disclosure, the amount of sweep can vary (i.e., the amount and/or angle of tilt of the airfoil that is swept can vary). In some embodiments of the present disclosure, the amount of sweep of the full-span forward swept airfoils can be defined by the axial position of the tip relative to an airfoil root of the leading edge, defined as a function of or percentage of a hub axial chord of the respective airfoil (see, FIG. 9 and accompanying description). For example, leaning or tilting by moving the leading edge tip of the airfoil forward to a point 14% of the hub axial chord forward of the root of the leading edge may provide various advantages. As a result of the forward sweep, more flow can be drawn toward the tip of the blade before the airfoil, therefore increasing the total pressure of the flow that will go through a tip clearance gap G (without increasing an overall 1-D total pressure). Skewing the total pressure towards the tip in this way can allow aft movement of tip clearance vortices relative to the blade tip leading edge. The relative movement achieved by embodiments of the present disclosure can result in increased surge margin.

Figure 3A:
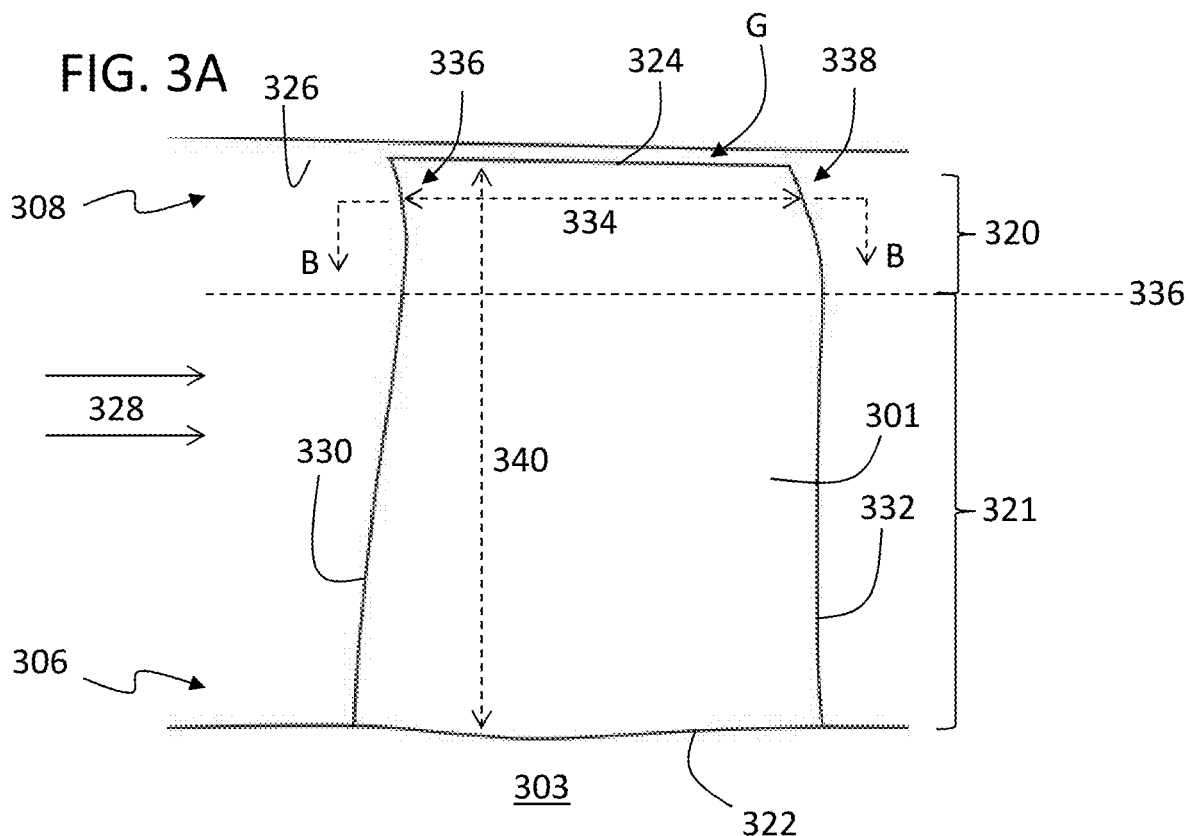
FIG. 3A is a side view schematic illustration of a local swept airfoil of a gas turbine engine.
Figure 3B:
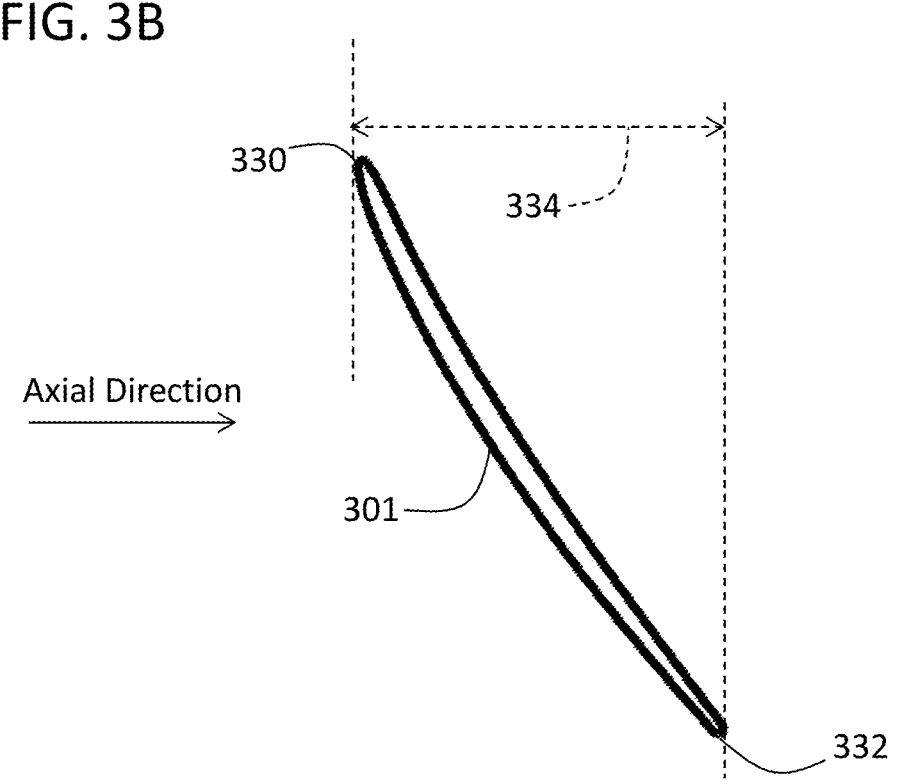
FIG. 3B is a cross-section view schematic illustration of the airfoil taken along the line B-B of FIG. 3A.

Turning to FIGS. 3A-3B, an airfoil 301 extending from a hub 303 having a local sweep 320 at an outer diameter 308 is schematically shown. The airfoil 301 extends from an airfoil root 322 at an inner diameter 306, e.g., at a platform, to the outer diameter 308 ending in an airfoil tip 324. The airfoil tip 324 may be proximate to an outer diameter flow path wall 326 of a flow path 328. As will be appreciated by those of skill in the art, the clearance gap G will exist between the airfoil tip 324 and the flow path wall 326, which is employed to allow the airfoil 301 to rotate within the flow path 320.

FIG. 3A is a side view illustration of the airfoil 301 and FIG. 3B is a cross-section illustration taken along the line B-B of FIG. 3A. The airfoil 301 extends from a leading edge 330 to a trailing edge 332. The airfoil 301 has an axial chord length 334, which in some embodiment may be a constant length at any vertical (i.e., span-wise direction) position (e.g., inner diameter axial chord length and outer diameter axial chord length are the same. In other embodiments, the axial chord length can be different at different span-wise direction positions (e.g., the inner diameter axial chord length can be longer than the outer diameter axial chord length, and the airfoil can be tapered from the inner diameter to the outer diameter).

As shown in FIG. 3A, the outer diameter 308 of the airfoil 301 has a local forward sweep 320. The local forward sweep 320 includes a leading edge local sweep 336 and a trailing edge local sweep 338. This is illustrated in FIG. 3A as the airfoil 301 leaning forward (e.g., left in FIG. 3A) at the outer diameter 308 (i.e., above local sweep line 336). Below the local sweep line 336, the airfoil 301 is relatively or substantially radial (vertical in FIG. 3A, i.e., no sweep, tilt, or lean). That is, the local sweep line 336 separates the span length of the airfoil 301 (e.g., in a span-wise direction 340) into a non-swept portion 321 (i.e., extending from the inner diameter 306 of the airfoil 301 to the local sweep line 336) and the local forward sweep 320 portion of the airfoil 301 (i.e., extending from the local sweep line 336 to the outer diameter 308 of the airfoil 301).

Figure 4A:
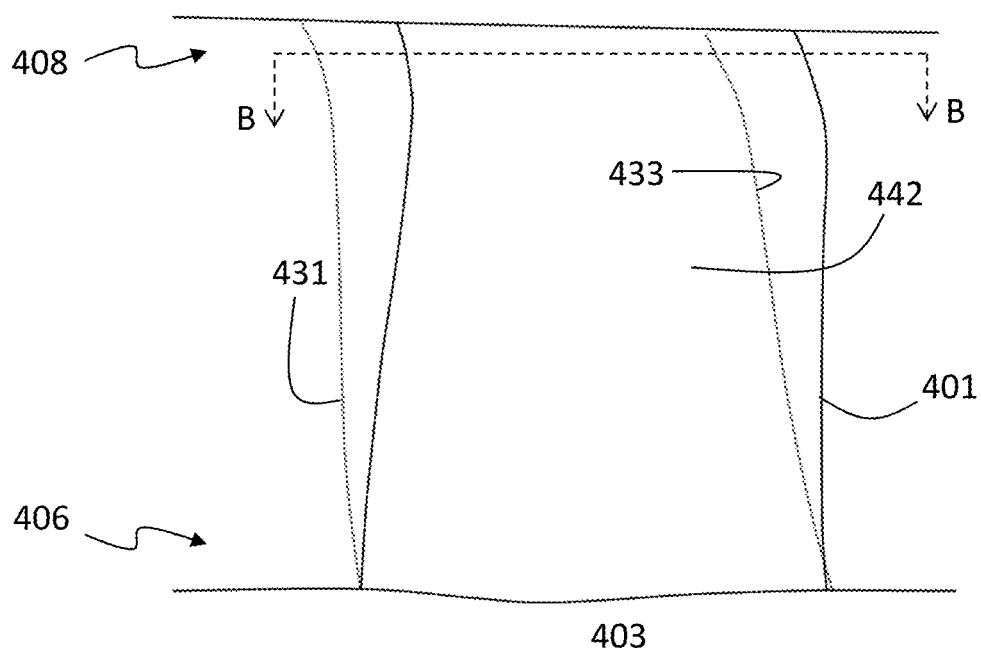
FIG. 4A is a side view schematic illustration of a full-span swept airfoil of a gas turbine engine in accordance with an embodiment of the present disclosure.
Figure 4B:
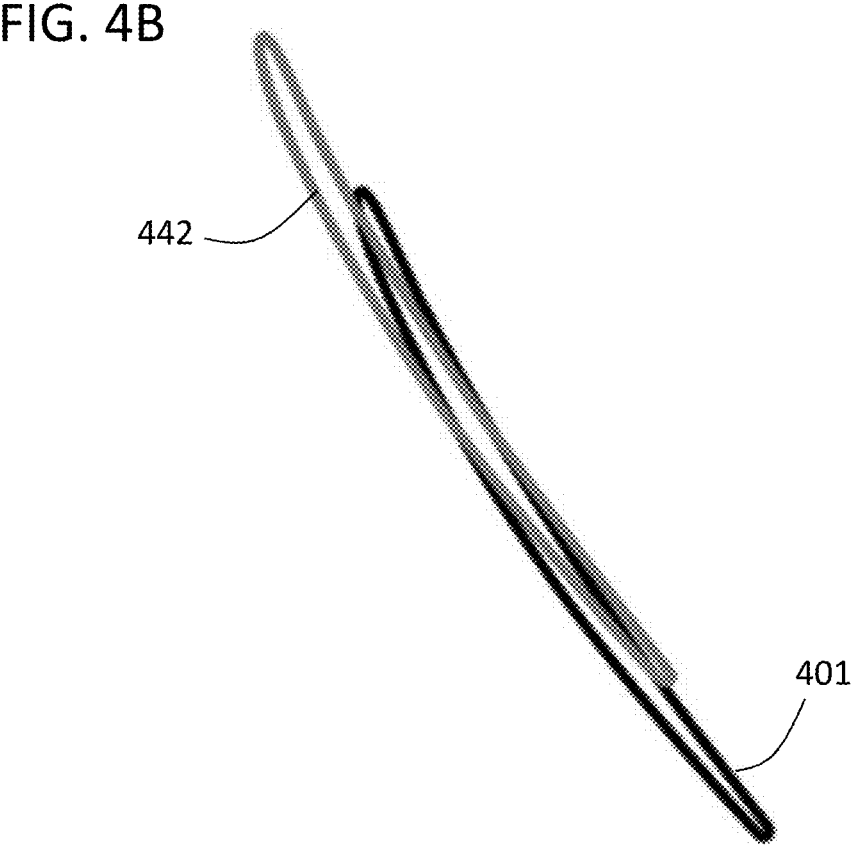
FIG. 4B is a cross-section view schematic illustration of the airfoil taken along the line B-B of FIG. 4A.

Turning now to FIGS. 4A-4B, a full-span forward swept airfoil 442 extending from a hub 403 in accordance with an embodiment of the present disclosure is shown. FIG. 4A illustrates the full-span forward sweep of the full-span forward swept airfoil 442 as compared to a local swept airfoil 401 (e.g., similar to that shown in FIGS. 3A-3B). FIG. 4B illustrates a cross-section view of the comparison of the two airfoils 401, 442, indicating the forward lean (or sweep) of the outer diameter of the full-span forward swept airfoil 442 as compared to the local swept airfoil 401. As will be appreciated by those of skill in the art, the two airfoils 401, 442 would have similar profiles at the inner diameter 406 (e.g., the two illustrations of FIG. 4B would be aligned). That is the full-span forward sweep of the airfoil 442 starts at the inner diameter 406 and leans or tilts the airfoil 442 as the span extends from the inner diameter 406 to the outer diameter 408 in the direction of the chord.

As show, a full-span forward sweep of the airfoil 442 has an inclined or tilted leading edge 431 and an inclined or tilted trailing edge 433.

Figure 5A:
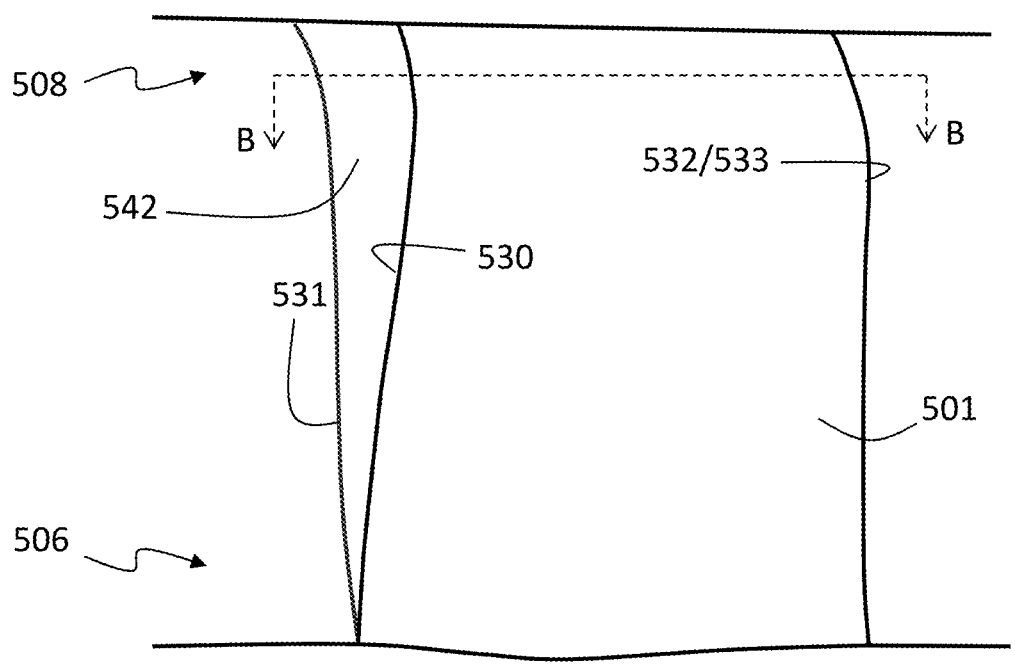
FIG. 5A is a side view schematic illustration of a full-span swept airfoil of a gas turbine engine in accordance with an embodiment of the present disclosure.
Figure 5B:
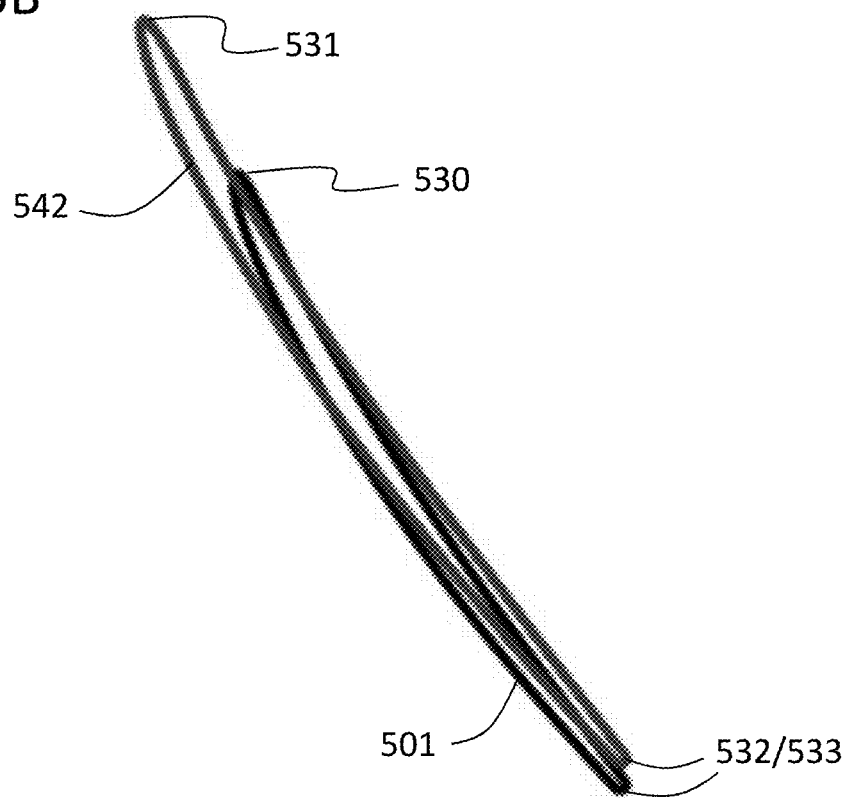
FIG. 5B is a cross-section view schematic illustration of the airfoil taken along the line B-B of FIG. 5A.

Turning now to FIGS. 5A-5B, another full-span forward swept airfoil 542 in accordance with an embodiment of the present disclosure is shown. In the embodiments of FIGS. 5A-5B, only the leading edge 531 of the full-span forward swept airfoil 542 is tilted or inclined, and the trailing edge 533 is not swept. That is, as shown, the trailing edge 533 of the full-span forward swept airfoil 542 is substantially aligned with a trailing edge 532 of a non-swept airfoil 501 (or local swept airfoil, e.g., as shown in FIGS. 3A-3B). However, at the leading edge 531 of the full-span forward swept airfoil 542, the full-span of the airfoil 542 is swept forward, as indicated (and as compared to a leading edge 530 of the non-swept airfoil 501).

Those of skill in the art will appreciate that the inner diameter 506 of the two airfoils 501, 542 are substantially similar. However, at the outer diameter 508, the full-span forward swept airfoil 542 has a longer chord length (e.g., as shown in FIG. 5B).

In some embodiments, the full-span forward swept airfoils shown and described above (and variations thereon) can be used for all blades on a single rotor of a gas turbine engine. Further, in some embodiments, a gas turbine engine can be configured such that different rotors of the engine have different types or configurations of full-span forward swept airfoils (or non-swept or locally swept airfoils). That is, different types of airfoil sweep can be used in a single engine.

Figure 6A:
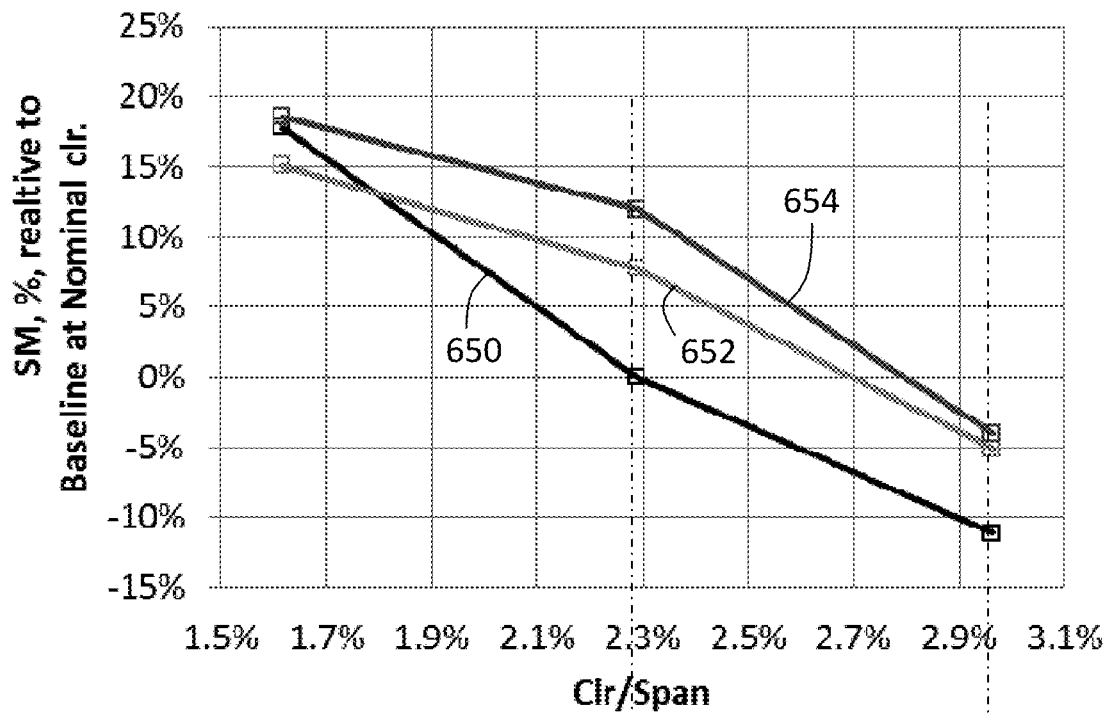
FIG. 6A is an illustrative plot presenting benefits of embodiments of the present disclosure.
Figure 6B:
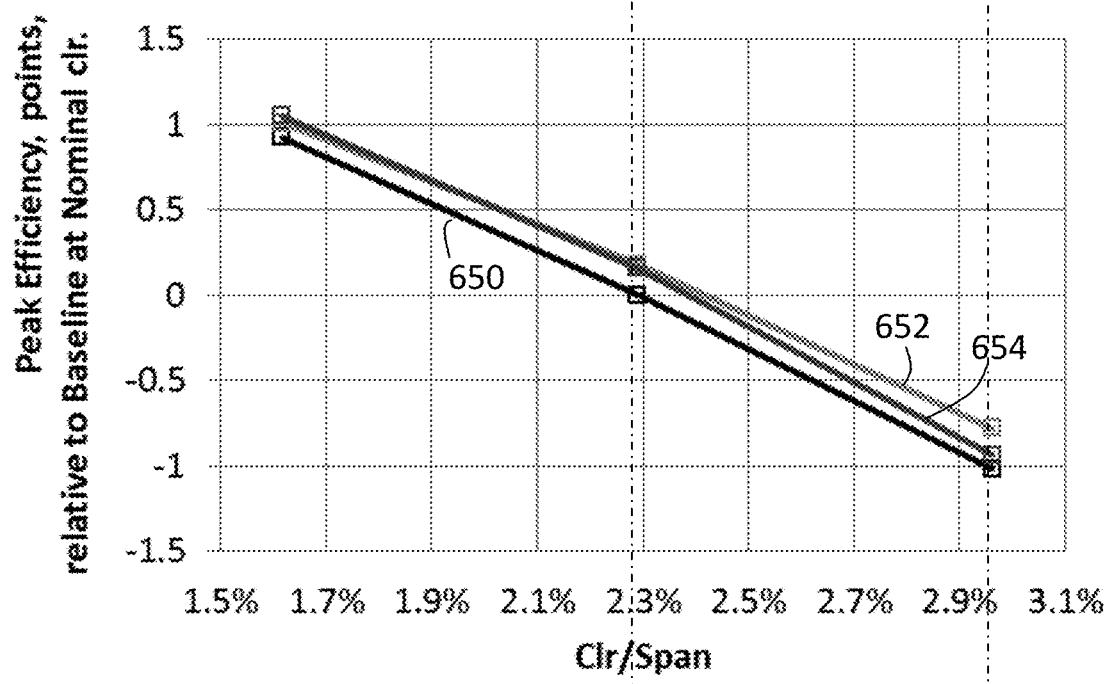
FIG. 6B is an illustrative plot presenting benefits of embodiments of the present disclosure.

Turning now to FIGS. 6A-6B, plots illustrating the advantages and benefits of constructing airfoils with full-span forward sweeps are shown. FIG. 6A illustrates surge margin (SM) as a percentage and relative to the baseline airfoil (i.e., with local sweep as shown in FIGS. 3A-3B) at a nominal clearance level, as a function of clearance-relative-to-span. FIG. 6B illustrates peak efficiency (in points) relative to the baseline airfoil (i.e., with local sweep as shown in FIGS. 3A-3B) as a function of clearance-relative-to-span.

Line 650 is a plot of the characteristics of a local sweep airfoil (e.g., similar to that shown in FIGS. 3A-3B), line 652 is a plot of the characteristics of a first full-span forward swept airfoil (e.g., similar to that shown in FIGS. 4A-4B), and line 654 is a plot of the characteristics of a second full-span forward swept airfoil (e.g., similar to that shown in FIGS. 5A-5B).

As illustrated in FIGS. 6A-6B, the sweep of the airfoil has little impact or minimal effect on efficiency (e.g., as shown in FIG. 6B where all lines 650, 652, 654 are all substantially similar). However, as shown in FIG. 6A, there are significant improvements in surge margin at nominal clearance (points on nominal clearance line 656) and at open clearance (points on open clearance line 658). Accordingly, embodiments of the present disclosure provide opportunities to trade excess surge margin for efficiency (which may be gained, for example, through reductions in airfoil count).

Figure 7:
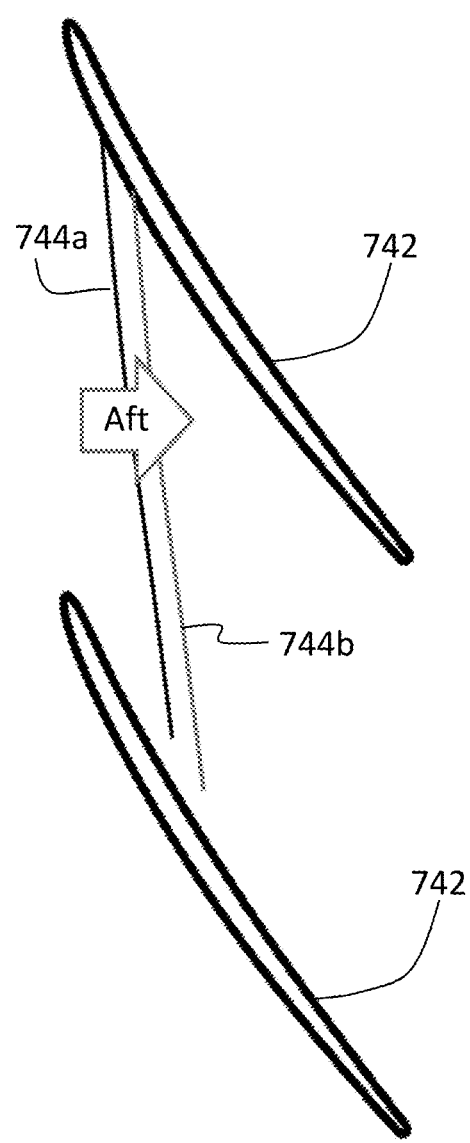
FIG. 7 schematically illustrates a change in clearance flow interface as achieved through embodiments of the present disclosure.

The above described (and plotted) improvements derive, in part, from the sweep causing the interface between the clearance flow leaking through the clearance gap and the main flow (i.e., a clearance flow interface) to be moved aft relative to the leading edge of the airfoils. For example, FIG. 7 illustrates the aft movement or shift of a clearance flow interface relative to the leading edge as compared to a typical clearance flow interface. That is, by employing a full-span forward swept airfoil 742 as provided in accordance with the present disclosure (e.g., as shown in FIGS. 4A-5B), the clearance flow interface 744a of a non-swept or local swept airfoil is moved or shifted aftward relative to the leading edge when a full-span forward swept airfoil is employed. This is illustrated as the full-span forward swept airfoil clearance flow interface 744b that is moved in the aftward direction relative to the leading edge.

Turning now to FIGS. 8A-8B, illustrations of stator stackings 850a, 850b of gas turbine engines are shown. The stator stackings 850a, 850b include a plurality of stator portions (e.g., vanes) and a plurality of rotor portions (e.g., blades) that alternate to form a compressor stage of a gas turbine engine. FIG. 8A is an illustration of a stator stack of high pressure compressor section having a plurality of non-swept or locally swept blades 852a (rotor portion) and a plurality of vanes 854a (stator portion). FIG. 8B is an illustration of a stator stack of a high pressure compressor section having a plurality of full-span forward swept blades 852b (rotor portion) and a plurality of vanes 854b (stator portion). As shown, the vanes 854b can have a sweep or be tilted to accommodate the full-span forward swept blades 852b. In some embodiments, each blade 852b may have a different sweep as compared to other of the blades 852b or of the stator stacking 850b. However, as will be appreciated by those of skill in the art, each blade on a single rotor will have the same sweep.

In some embodiments of the present disclosure, the amount of sweep of the full-span forward swept airfoils can be defined by the axial position of the airfoil tip leading edge relative to the airfoil root leading edge, defined as a function of or percentage of the axial chord length of the respective airfoil. In some embodiments, the full-span forward sweep can be any full-span forward sweep that places a leading edge tip forward of a leading edge root by a distance 5% or greater than the root axial chord length of the airfoil. Further, in some embodiments, the full-span forward sweep of the leading edge tip and the trailing edge tip of the airfoil, relative to leading edge root and trailing edge root, respectively, may have different sweep percentages as a percentage of root axial chord length. In some embodiments, the sweep may be between 5% and 25% of the root axial chord length.

Figure 9:
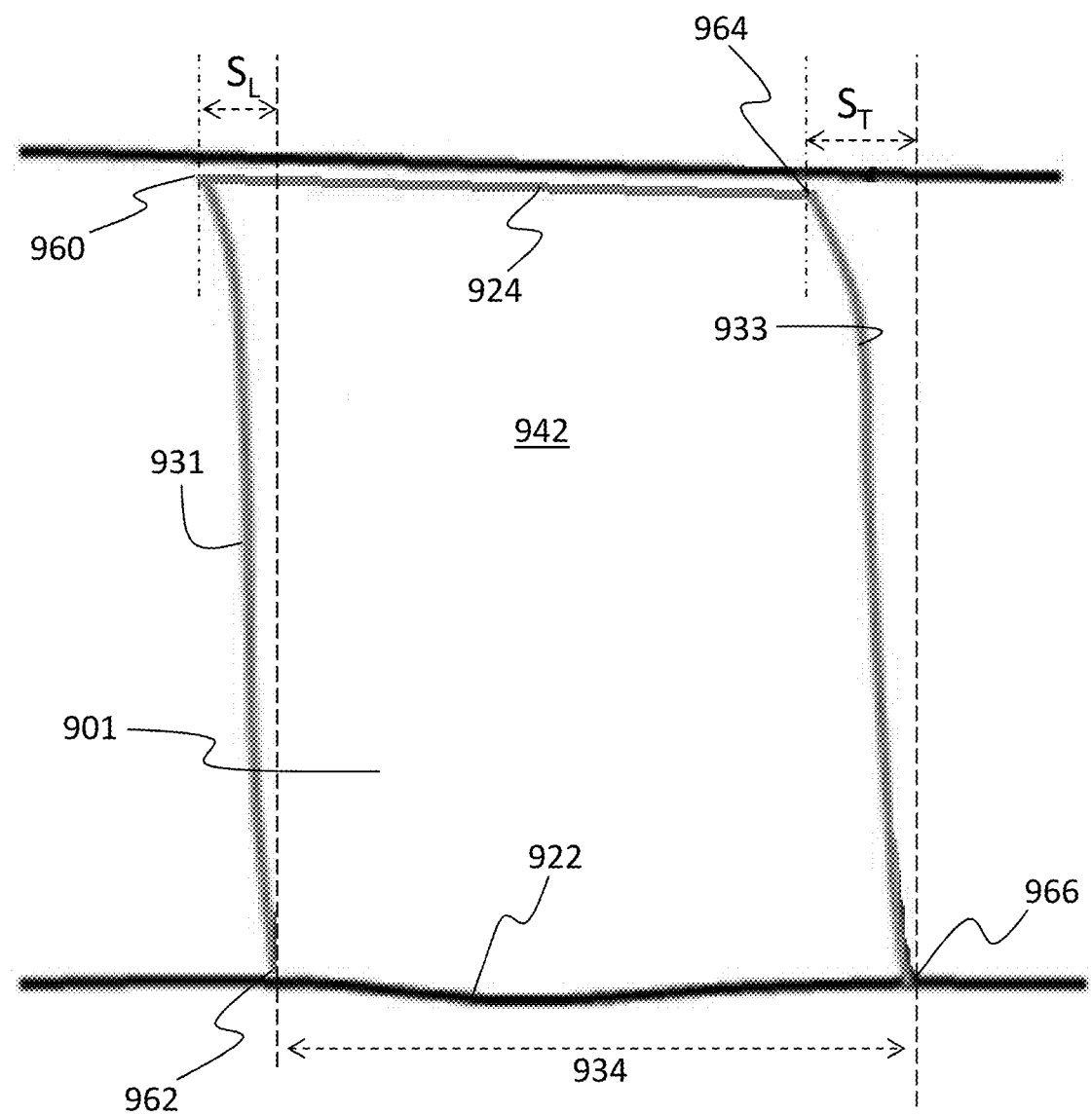
FIG. 9 is a schematic illustration of a full-span forward swept airfoil in accordance with an embodiment of the present disclosure.

Turning to FIG. 9, a schematic illustration of a full-span forward swept airfoil in accordance with an embodiment of the present disclosure is shown. As shown, a full-span forward swept airfoil 942 having a root axial chord length 934 is shown. The full-span forward swept airfoil 942 extends from an airfoil root 922 at an inner diameter, e.g., at a platform, an airfoil tip 924 at an outer diameter.

The full-span forward swept airfoil 942 has a leading edge sweep $S_L$ and a trailing edge sweep $S_T$. As illustrated, the leading edge sweep $S_L$ is defined as an axial distance of a tip leading edge 960 from a root leading edge 962, in a direction of the root axial chord length 934. Similarly, the trailing edge sweep $S_T$ is defined as an axial distance of a tip trailing edge 964 from a root trailing edge 966, in a direction of the root axial chord length 934. In some embodiments, the trailing edge sweep $S_T$ can be relatively small, e.g., between 0% and 10% of the root axial chord length 934 (e.g., as shown in FIG. 5A-5B). In other embodiments, the trailing edge sweep $S_T$ can be larger than 0%-10% of the root axial chord length 934, such as 25% or greater (e.g., as shown in FIGS. 4A-4B), and in some embodiments, the trailing edge sweep $S_T$ can be greater than the leading edge sweep $S_L$.

In one non-limiting embodiment, the full-span forward swept airfoil 942 has a leading edge sweep $S_L$ of 14% of the root axial chord length 934 and a trailing edge sweep $S_T$ of 7% of the root axial chord length 934. In another non-limiting embodiment, the full-span forward swept airfoil 942 has a leading edge sweep $S_L$ of 14% of the root axial chord length 934 and a trailing edge sweep $S_T$ of 19% of the root axial chord length 934. In some embodiments, the leading edge sweep $S_L$ and the trailing edge sweep $S_T$ can be the same or equal as a percentage of the axial chord length of the airfoil.

In other non-limiting embodiments, the full-span forward sweep can have a sweep of between 0% and 50%, between 10% and 50%, or between 12.5% and 25% of the axial chord length of the blade. Further, in some non-limiting embodiments, the leading edge of a full-span swept airfoil can have a sweep of 25% of the root axial chord length or greater and the trailing edge can have a sweep of less than 25% of the root axial chord length. Further still, in other non-limiting embodiments, the leading edge can have a sweep of 25% of the root axial chord length and the trailing edge can have a sweep of 12.5% of the root axial chord length.

Advantageously, embodiments described herein provide improved efficiency airfoils and rotors of gas turbine engines. For example, in accordance with some embodiments, a surge margin of tip-limited axial compressors (e.g., small-core axial high pressure compressor) can be improved by the full-span forward sweep described herein. In accordance with various embodiments, an improvement of at least 5% at very large (>3% span) clearances can be obtained. Furthermore, excess surge margins can be traded for efficiency through a number of means, including, but not limited to the removal of airfoils on a rotor (e.g., fewer airfoils and thus less whetted area; i.e., lower solidity of the rotors).

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A rotor of a gas turbine engine comprising:
a rotor hub; and
a plurality of blades extending from the rotor hub, wherein each blade has a full-span forward sweep along a leading edge of the blade that starts at a root leading edge at an airfoil root of the blade at the hub and extends to a tip leading edge at a blade tip, wherein a sweep of a blade is a percentage of a root axial chord length of the respective blade, wherein the leading edge sweep is defined as an axial distance of the tip leading edge from the root leading edge in a direction of the root axial chord length,
wherein each blade has a full-span forward sweep along a trailing edge of the blade that starts at the airfoil root of the blade at the hub and extends to the blade tip, and
wherein the leading edge has a sweep of 14% of the root axial chord length or greater and the trailing edge has a sweep of less than 25% of the root axial chord length.

2. The rotor of claim 1, wherein the full-span forward sweep along the leading edge has a sweep of between 14% and 25% of the root axial chord length of the blade.

3. The rotor of claim 1, wherein the trailing edge of each blade has the same sweep as the leading edge.

4. The rotor of claim 1, wherein the trailing edge of each blade has a sweep that is less than the sweep of the leading edge.

5. The rotor of claim 1, wherein the leading edge has a sweep of 14% of the root axial chord length and the trailing edge has a sweep of 18% of the root axial chord length.

6. A gas turbine engine comprising:
a plurality of stator portions each having a plurality of vanes; and a plurality of rotor portions, wherein the stator portions and the rotor portions alternate to form a compressor section of the gas turbine engine, wherein each rotor portion comprises:
a rotor hub; and
a plurality of blades extending from the rotor hub, wherein each blade has a full-span forward sweep along a leading edge of the blade that starts a root leading edge at an airfoil root of the blade at the hub and extends to a tip leading edge at a blade tip, wherein a sweep of a blade is a percentage of a root axial chord length of the respective blade, wherein the leading edge sweep is defined as an axial distance of the tip leading edge from the root leading edge in a direction of the root axial chord length,
wherein each blade has a full-span forward sweep along a trailing edge of the blade that starts at the airfoil root of the blade at the hub and extends to the blade tip, and
wherein the leading edge has a sweep of 14% of the root axial chord length or greater and the trailing edge has a sweep of less than 25% of the root axial chord length.

7. The gas turbine engine of claim 6, wherein the full-span forward sweep along the leading edge has a sweep of between 14% and 25% of the root axial chord length of the blade.

8. The gas turbine engine of claim 6, wherein the trailing edge of each blade has the same sweep as the leading edge.

9. The gas turbine engine of claim 6, wherein the trailing edge of each blade has a sweep that is less than the sweep of the leading edge.

10. The gas turbine engine of claim 6, wherein the leading edge has a sweep of 14% of the root axial chord length and the trailing edge has a sweep of 18% of the root axial chord length.

11. The gas turbine engine of claim 6, wherein the full-span forward sweeps of the blades of each rotor portion is the same.

12. The gas turbine engine of claim 6, wherein the vanes of the stator portions are swept to accommodate the sweep of the blades of the rotor portions.

* * * * *